United States Patent [19]

Lutes et al.

[11] 3,902,167

[45] Aug. 26, 1975

[54] MAGNETIC THIN FILM SWITCH

[75] Inventors: Olin S. Lutes, Bloomington; James O. Holmen, Minnetonka; Richard L. Kooyer, Minneapolis, all of Minn.

[73] Assignee: Honeywell Inc., Minneapolis, Minn.

[22] Filed: Feb. 25, 1974

[21] Appl. No.: 445,189

[52] U.S. Cl. .......................................... 340/174 PW; 340/174 TW; 340/174 QA; 340/174 PM; 340/174 AC; 340/174 RC; 335/3

[51] Int. Cl.[2] .......................................... G11C 11/155

[58] Field of Search ............ 340/174 PW, 174 PM, 340/174 TW, 174 MS; 335/3, 79, 215

[56] References Cited

UNITED STATES PATENTS 3,228,012 1/1966 Meier .......................... 340/174 PW 3,434,119 3/1969 Onyshkevych .............. 340/174 MS

OTHER PUBLICATIONS

IBM Technical Disclosure Bulletin Vol. 16, No. 6, Nov. 1973, p. 1953.

*Primary Examiner*—James W. Moffitt
*Attorney, Agent, or Firm*—David R. Fairbairn

[57] ABSTRACT

A magnetically actuated switch capable of operating in a variety of modes utilizes a plated wire magnetic film switching element.

30 Claims, 15 Drawing Figures

MAGNETIC THIN FILM SWITCH

BACKGROUND OF THE INVENTION

The present invention relates to magnetic switching. In particular, the present invention is a magnetic switch which utilizes a plated wire magnetic film switching element.

Magnetic film plated wires are in common use in computer memories. A "plated wire" is typically a wire substrate having a diameter of about 0.0025 cm to about 0.0375 cm and having a thin coating of a magnetic film covering the substrate. The thin magnetic film is generally a nickel iron alloy such as permalloy. The preferred magnetization direction or "easy axis" of magnetization is usually oriented circumferentially around the wire, although there have been suggestions in some patents that an axial or helical orientation of the easy axis might also be used.

The requirements for a magnetic memory element and those for a magnetic switch are quite different. In typical plated wire magnetic memory elements, the flux reversal is accomplished by applying pulsed magnetic fields which are much greater than the switching threshold. In a magnetic switch, on the other hand, the flux reversal is typically actuated slowly and by small field increments. In the case of a plated wire memory element, part of the magnetic field used for flux reversal is generated by applying a current through the wire. In a magnetic switch, this arrangement would be unsatisfactory since the actuating magnetic field is applied by external sources.

Plated wire magnetic films have also been used for magnetic field sensing. One type of plated wire magnetic field sensor was described in French Pat. No. 1,585,806. In this patent a magnetic plated wire having an easy axis oriented axially was used. An alternating magnetic pumping field was directed parallel to the easy axis of magnetization. This field was sufficient to switch the magnetization direction of the plated wire every cycle. The external magnetic field along the easy axis of magnetization was sensed by determining the time interval between reversals of the magnetization direction.

There are important differences between a magnetic sensor and a magnetic switch. A sensor is used to measure the magnitude of a magnetic field. The output from the magnetic sensor changes continuously with increasing magnetic field. The magnetic switch, on the other hand, has only two states. When the external magnetic field is below the threshold, the magnetic switch is in one state. When the external magnetic field exceeds the threshold, the switch assumes the other state. The output of the magnetic switch, in other words, has only two signal levels or states while the magnetic sensor has a range of signal levels depending upon the magnitude of the external magnetic field.

SUMMARY OF THE INVENTION

The present invention is a magnetically actuated switch. The switching element is a wire substrate which is covered with a magnetic film. In the undisturbed state, the magnetization of the magnetic film has a component along the wire axis. Actuator means applies an external magnetic field having a component along the axis of the wire which is sufficient to change the state of the magnetic switching element. Output means senses the state of the magnetic switching element.

DESCRIPTION OF THE PREFERRED EMBODIMENTS

Magnetic Switching Elements

Figure 1A:
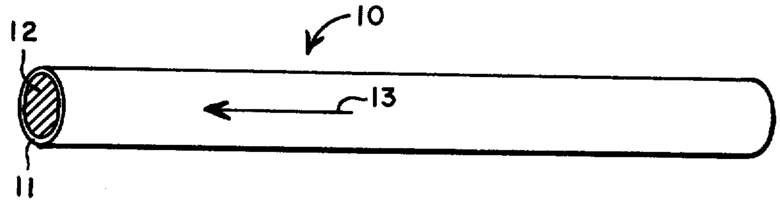
FIGS. 1*a* and 1*b* show plated wire switching elements for use in the present invention.
Figure 1B:
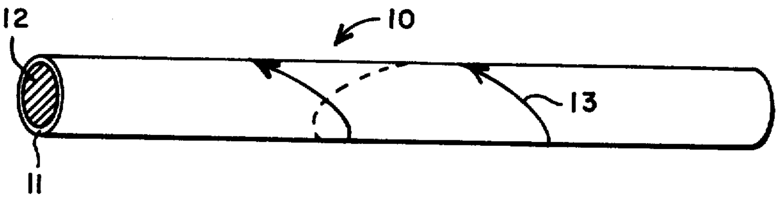

FIGS. 1*a* and 1*b* show magnetic switching elements which are utilized in the present invention. The switching element 10 consists of a magnetic film 11 plated on a wire substrate 12. The easy axis of magnetization 13 of magnetic film 11 is oriented with a component along the axis of wire substrate 12. In FIG. 1*a*, easy axis 13 is aligned along the wire axis. In FIG. 1*b*, easy axis 13 is oriented helically around the wire.

Magnetic film 11 may be any of a variety of magnetic materials. The preferred magnetic film is a nickel-iron permalloy layer having a nominal composition of 80% nickel and 20% iron. Substrate 12 may be either a non-magnetic or a magnetic wire, depending upon the switching properties desired. If a non-magnetic substrate is desired, Phosphor Bronze or beryllium-copper wires have been found to be suitable substrates. In the preferred embodiments, the diameter of substrate 12 is between about 0.0025 cm to 0.0375 cm, and the thickness of magnetic film 11 is between about 1,000 A and 100,000 A.

Although a large number of different processes are well known in the art for the preparation of plated wires, one process which has been used is as follows. The plated wires consisted of 0.0025 cm diameter Be-Cu (alloy 125) substrate wires plated with a relatively smooth 1 $\mu$m layer of copper, followed by a 1 $\mu$m layer of zeromagnetostrictive permalloy. The plating was followed by a stabilization anneal at 375°C. The copper was deposited from a pyrophosphate bath. The Ni-Fe bath was a simple sulphate system with saccharin as a grain refinement additive. Plated wires made by this process had an anisotropy field ($H_K$) of about 2.0 Oe and an easy axis dispersion ($\alpha_{90}$) of about 2.5°.

The easy axis orientation was varied by the superposition of axial and circumferential magnetic fields applied during plating, using external field coils and wire current. The approximate field capabilities were 0–100 Oe and 1–10 Oe, respectively. The relative magnitude of the two fields determines the subsequent helical angle of magnetization, which is given by $\tan^{-1}$ [H(circumferential)/H(axial)].

The axial and helical orientations of the easy axis 13 offer an advantage over the circumferential orientation of the easy axis commonly used in plated wire memory elements. For both axial and helical easy axis orientations, the magnetic flux of of the film may be reversed by application of an external field alone without the presence of a current in the substrate.

Pulse Interruption Switching Mode

The pulse interruption switching mode magnetic switch comprises a plated wire switching element, input means, actuator means, and output means. The input means applies a magnetic field with a component along the axis of the plated wire magnetic switching element which is sufficient to periodically reverse the magnetization direction of the switching element. The actuator means applies a magnetic field with a component along the axis which is sufficient to inhibit reversal of the magnetization direction. The output means senses whether the switching element is in a reversing or nonreversing state.

Figure 2:
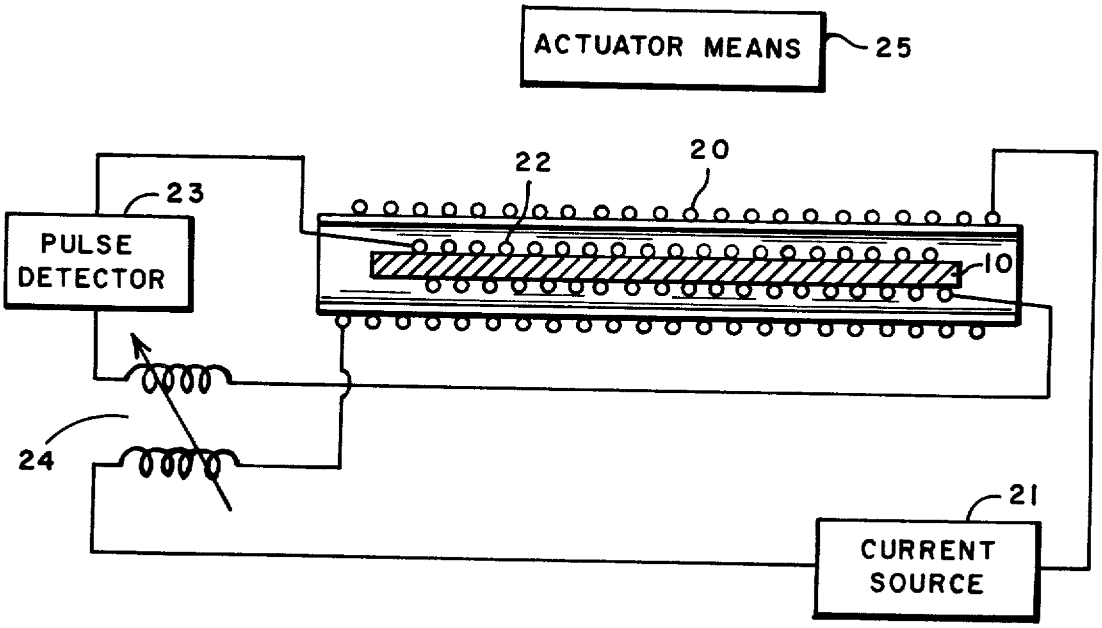
FIG. 2 shows a circuit diagram of a magnetic switch operating in the pulse interruption switching mode.

FIG. 2 shows a schematic diagram of a pulse interruption switching mode magnetic switch. The plated wire switching element 10 is of the type described in FIGS. 1*a* and 1*b*. Drive coil 20 and current source 21 form the input means. The output means comprises sense coil 22, pulse detector 23, and mutual inductance element 24. Actuator means 25 is a source of an external magnetic field.

In the pulse interruption mode of operation, the input means applies an alternating magnetic field along easy axis 13 of magnetic switching element 10. As shown in FIG. 2, this alternating magnetic field may be applied by drive coil 20 and current source 21. Alternatively, the alternating magnetic field may be applied by any other suitable source of alternating field and may have a sinusoidal, triangular, square, or other alternating waveform.

The alternating magnetic field applied by the input means has sufficient magnitude to reverse the magnetization of switching element 10 two times each cycle. The reversal occurs each time the instantaneous magnetic field reaches the threshold value while opposing the existing direction of magnetization. At each reversal, a voltage pulse is generated in sense coil 22 due to the sudden change of flux through sense coil 22. This steady state of operation constitutes the "on" state of the switch, and the voltage pulses constitute the output of the "on" state. This state prevails as long as the field exceeds the threshold on both the positive and negative swings.

Actuator means 25 turns the magnetic switch "off" by applying an external magnetic field along easy axis 13. The external magnetic field opposes the alternating magnetic field during one half cycle and aids the alternating field during the other half cycle. The magnitude of the external magnetic field applies by actuator means 25 is such that the peak magnetic field in one direction is less than the threshold when the actuating magnetic field opposes the alternating magnetic field. Because reversal is inhibited during one half of the cycle, all reversal is inhibited. This is so even though the peak field in the opposite direction greatly exceeds the threshold. In the "off" state, the output from sense coil 20 contains no voltage pulses. In other words, the "on" state is indicated by the presence of voltage pulses, and the "off" state is indicated by the absence of voltage pulses.

As discussed previously, the output means comprises sense coil 22, pulse detector 23, and mutual inductance element 24. The voltage output from sense coil 22 is received by pulse detector 23, which senses the presence or absence of voltage pulses from sense coil 22. Mutual inductance element 24 compensates for unwanted voltage changes such as the direct pickup between drive coil 20 and sense coil 22.

In the preferred embodiments of the pulse interruption mode, the input means also applies a DC magnetic bias field along the axis of the wire. The purpose of the DC bias field is to reduce the magnitude of the actuating external magnetic field needed to change the magnetic switch from the "on" to the "off" state. The DC magnetic bias field may be supplied by an external source such as a permanent magnet or a field coil, or it may be supplied by drive coil 20 and current source 21. The bias field may also be supplied ty the use of selected square loop ferromagnetic materials either as wire substrate 12 or as an additional film coating on plated wire switching element 10.

The DC magnetic bias field is applied along the axis of the wire 13 to oppose the alternating magnetic field during one half of the cycle. The DC bias field aids the alternating field during the other half cycle. The magnitude of the DC bias field is selected to be a value such that the peak of the total field just exceeds the threshold in the half cycle during which the DC bias field opposes the alternating magnetic field. This means that only a small additional actuating external field in the same direction as the DC bias field will keep the peak field from exceeding the threshold in one direction, and thus turn the switch "off."

Figures 3A, 3B, 3C:
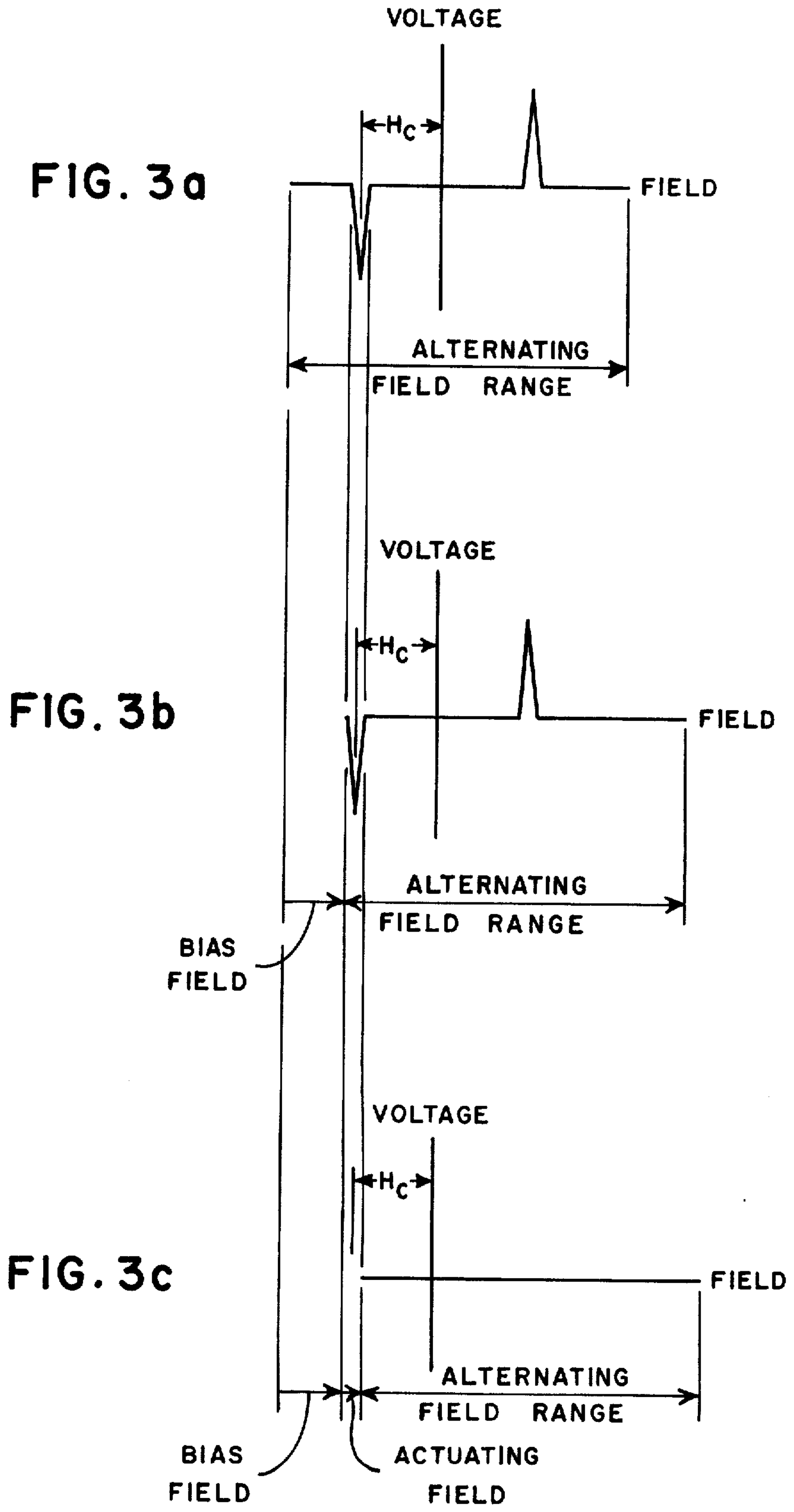
FIGS. 3*a*, 3*b*, and 3*c* show the output pulses from the magnetic switch of FIG. 2 with no actuation, actuation just below the switching threshold, and actuation exceeding the switching threshold, respectively.

FIGS. 3*a*, 3*b*, and 3*c* demonstrate the output from a magnetic switching operating in the pulse interruption switching mode. In FIG. 3*a*, the actuating external magnetic field and the DC bias field are both zero. In this situation, the switch is in the "on" state. The output from the switch consists of a sequence of voltage pulses alternating in polarity. FIG. 3*a* shows the two pulses generated in a full cycle of the alternating magnetic field. It can be seen that the alternating magnetic field exceeds the threshold in both directions.

FIG. 3*b* shows the output from the switch when the DC bias field is such that the peak alternating magnetic field just exceeds the threshold field $H_c$ in one direction. In this situation, the magnetic switch is still in the "on" state since voltage pulses are being produced.

In FIG. 3*c*, an external magnetic field from the actuator means has been added to the DC bias field. The combined effect of the external magnetic field and the DC bias field now allows the peak magnetic field to exceed the threshold in only one direction. Since the magnetization direction of the wire is no longer being reversed, the output shows no voltage pulse. The switch is, therefore, in the "off" state. The sensitivity of the switch may be defined by the increment of external magnetic field from the actuator means required to turn off the switch.

Figure 4:
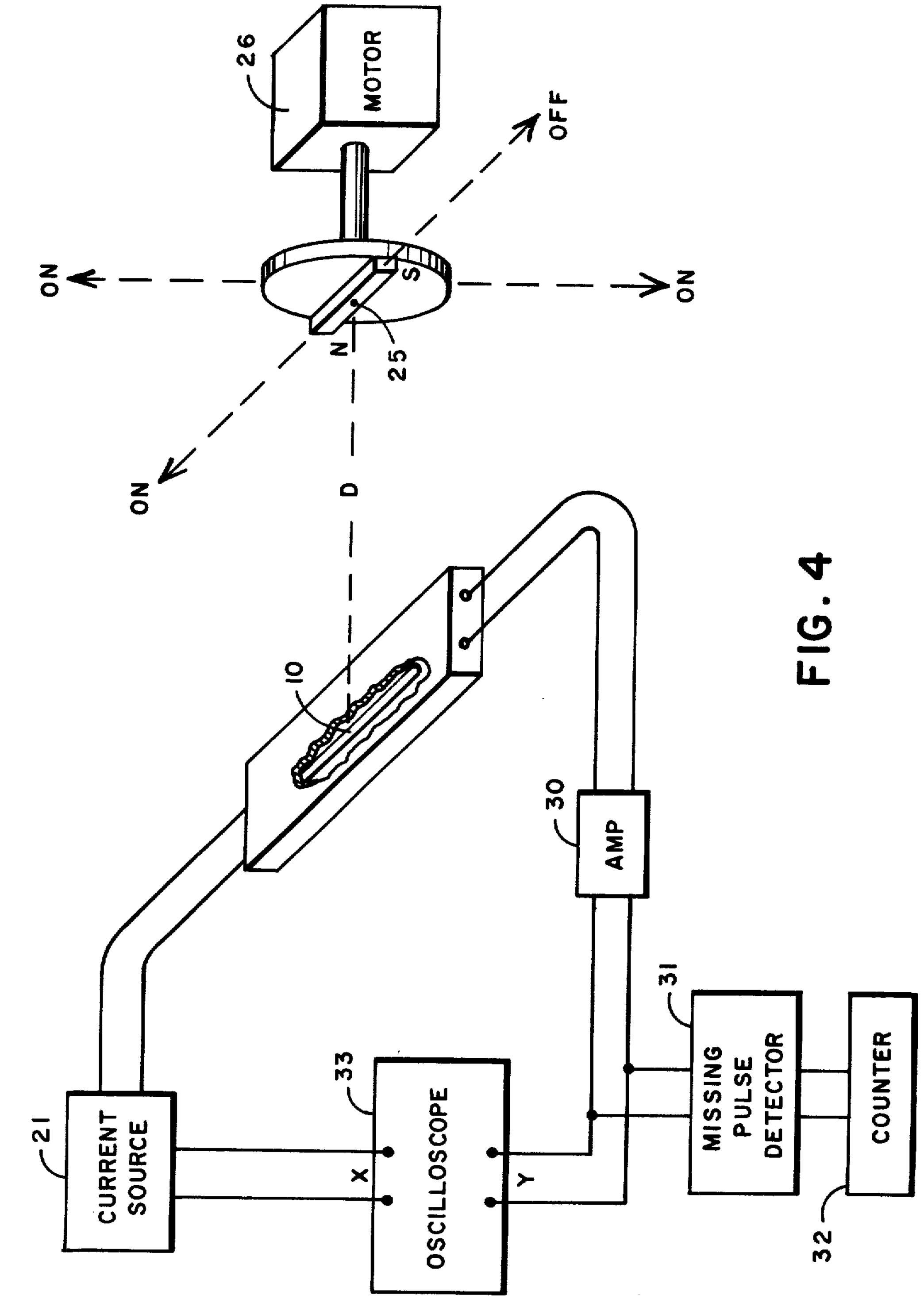
FIG. 4 shows a system for demonstrating the pulse interruption switching mode of the plated wire magnetic switch.

FIG. 4 shows a system used to demonstrate the operation of the pulse interruption mode magnetic switch. In this demonstration model, the actuator means 25 was a permanent magnet located a distance D from switching element 10 and rotated by motor 26.

The plated wire magnetic switch used in the demonstrator of FIG. 4 was similar to the switch shown in FIG. 2. For simplicity, drive coil 20 and sense coil 22 have not been shown.

The output from sense coil 22 was amplified by amplifier 30 and directed to two pulse detecting systems. The first system consisted of missing pulse detector 31 and counter 32. Whenever the pulses were interrupted, the missing pulse detector would indicate the interruption as a single count. Counter 32 registered each count and provided a digital total of the number of pulse interruptions.

The second pulse detecting system was oscilloscope 33. The voltage output from amplifier 30 was directed to the $y$ input of oscilloscope 33, while the input signal from current source 21 was directed to the $x$ input of oscilloscope 33. Oscilloscope 33 thus provided a visual display of voltage as a function of input signal similar to the graphs of FIG. 3.

Current source 21 applied both an alternating and a DC current to drive coil 20. The input field applied by drive coil 20 to switching element 10 was, therefore, an alternating magnetic field plus a DC magnetic bias field.

The switch was actuated by a small magnetic field increment furnished by actuating magnet 25. The external actuating magnetic field at switching element 10 due to actuating magnet 25 had maximum effect when the magnet axis was parallel to the easy axis of switching element 10. For one such orientation the external magnetic field substracted from the DC bias field, thus enhancing the normal "on" state of the switch. In the opposite parallel orientation, the external magnetic field added to the DC bias field, thereby furnishing enough magnetic field to turn the switch "off." The threshold field was furnished at some intermediate angle of rotation. In FIG. 4, the "on" and "off" designations correspond to orientation of the north pole in the direction shown. The "on"/"off" angular sector ratio may be varied.

The switching action of the rotating actuating magnet 25 was clearly demonstrated by the periodic appearance and disappearance of the pulse pattern on oscilloscope 33. Missing pulse detector 31 and counter 32 demonstrated the feasibility of electric counting and recording by means of the magnetic switching element of the present invention. Using the demonstration model of FIG. 4, switching was observed using input frequencies from 60 to 1,000 Hz, magnet rotation frequencies from 10 to 2,000 rpm, and magnet distances from 5 to 14 cm. Table 1 is a list of components used in the demonstration model.

Table 1

| | |
|---|---|
| Switching element 10 | 0.025 cm diameter, 5 cm length, 80% nickel-20% iron magnetic film, easy axis oriented axially |
| Drive coil 20 | 35 turns/cm |
| Current source 21 | Hewlett Packard 3310A function generator |
| Sense coil 22 | 200 turns |
| Actuating magnet 25 | volume = 0.3 cm³ measured flux density about 4,000 gauss |
| Motor 26 | Gerald K. Heller Co. 2T60 variable speed motor |
| Amplifier 30 | gain approximately 20 |
| Missing pulse detector 31 | Signetics missing pulse detector |
| Counter 32 | General Radio 1192 |
| Oscilloscope 33 | Tektronix 503 |

Figure 5:
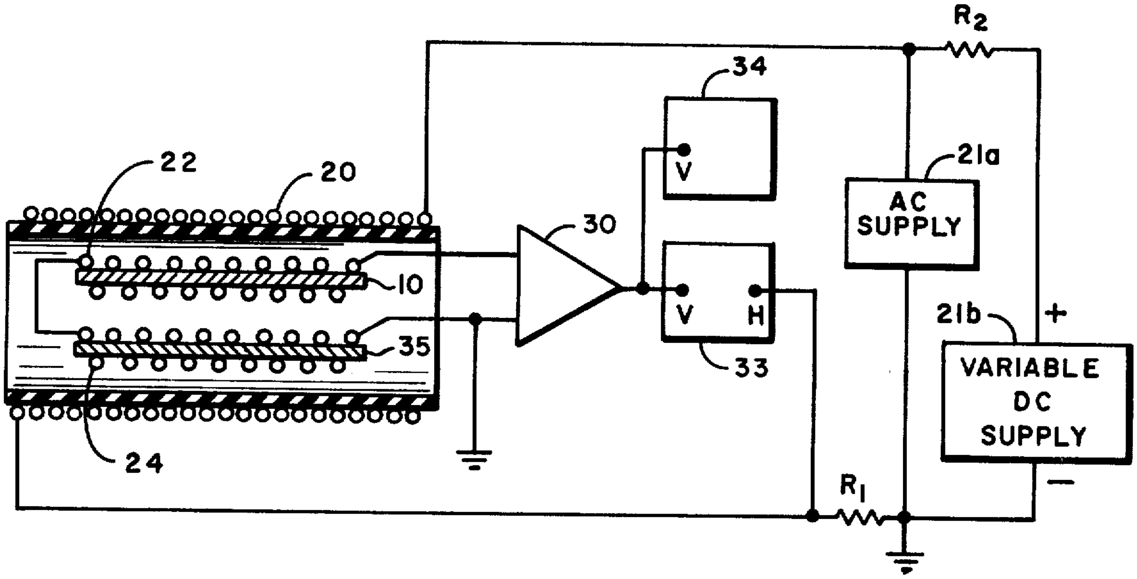
FIG. 5 shows an experimental system for investigating the switching characteristics of the plated wire magnetic switch.

A study was made of the switching process involved in the pulse interruption mode. FIG. 5 shows the experimental system used for this switching study. The system was generally similar to the systems shown in FIGS. 2 and 4, and similar numerals have been used to designate similar elements. The alternating magnetic field drive for the magnetic switch was supplied by AC supply 21*a*, which furnished current to drive coil 20 at frequencies ranging from 0.001 to 1,000 Hz. Switching element 10 was contained in sense coil 22, which was connected in series opposition with a compensation coil 24 containing a non-magnetic dummy wire 35. The positive and negative voltage pulses generated in sense coil 22 by each cycle of the alternating magnetic field were amplified by amplifier 30. The output of amplifier 30 was connected to oscilloscopes 33 and 34. The positive and negative voltage pulses generated by each cycle of the alternating magnetic field were displayed on an $x$-$y$ basis by oscilloscope 33. Individual pulses were viewed on a time basis by triggering oscilloscope 34.

A DC bias current was applied to drive coil 20 by variable DC supply 21*b*. The DC bias field generated by drive coil 20 was controlled to within ± 0.001 Oe. The DC bias field, as well as the alternating magnetic field provided by drive coil 20 were uniform and axially directed. The relative dimensions of drive coil 20 and sense coil 22 in FIG. 5 are shown somewhat different from the actual system for clarity of description. In this exerpimental study, switching element 10, drive coil 20, sense coil 22, compensation coil 24, and dummy wire 35 were contained in a magnetically shielded enclosure. The components used in this experimental study are listed in Table 2.

Table 2

| | |
|---|---|
| Magnetic switching element 10 | beryllium-copper wire, length 5 cm, diameter 0.025 cm, 80% nickel-20% iron magnetic film, easy axis aligned axially |
| Drive coil 20 | 35 turns/cm |
| AC supply 21 | Hewlett Packard 3310A |
| Variable DC supply 21b | Lambda LK 351 FM |
| Resistor R1 | 1 ohm |
| Resistor R2 | 200 ohms |
| Sense coil 22 | 200 turns |
| Compensation coil 24 | 200 turns |
| Amplifier 30 | Signetics A741 |
| Oscilloscope 33 | Tektronix 503 |
| Oscilloscope 34 | Tektronix 454 (normal trigger) |
| Dummy wire 35 | beryllium-copper wire, length 5 cm, diameter 0.025 cm |

The experimental apparatus of FIG. 5 was used to ascertain the abruptness of the switching process by applying very small increments of DC bias field, thereby very gradually reducing the overdrive to zero and turning off the pulses. In this study, the independent variable was the overdrive $H_o$. The overdrive may be defined as $$H_o = H_m - H_c,$$

$H_m$ = the peak field value attained during a cycle, and
$H_c$ = the threshold field of the plated wire switching element.

The dependent variables in this switching study were the pulse height and width and the number of pulses per unit time interval. The manner in which these quantities changes during the switching transition was observed. The major features of these results were as follows:

1. Some reduction (about 25 percent) in pulse height occurred in going from large overdrives of 5 Oe to overdrives of about 1 Oe.
2. In the range of 1 Oe to 0.05 Oe overdrive, there was no significant reduction in positive pulse height, but the negative pulse height was reduced by about 30 percent.
3. In the final stage of switching, between 0.07 Oe and 0.02 Oe overdrive, a reduction in the number of pulses per unit time was evident.
4. Only within 0.02 Oe of the threshold was the positive pulse height reduced substantially from its values at 1 Oe overdrive.
5. The area under the pulse traces was not reduced more than 15 percent between the largest (5.2 Oe) and the smallest (0.02 Oe) overdrive.

From these results, it may be concluded that at large overdrives, far removed from the switching threshold, there was an enhancement of signal, probably connected with greater speed of domain walls. During the switching process, the pulse train was turned off in an interval of about 0.01 Oe by a reduction in the number of pulses and also by a decline in pulse height. The pulse height remained substantial, however, in the positive pulse (the pulse with the greater overdrive) down to the final state of switching (less than 0.05 Oe).

It is also of interest that the experiment did not reveal a substantial degree of de-magnetization. In other words, most of the flux continued to be reversed with repeated switching, as indicated by the small fractional loss of area under the pulse traces described in item 5 above.

Single-Event Switching Mode

The magnetic switch of the present invention may also be used in a single-event switching mode. In this mode the switch is set in one polarity (magnetization direction) prior to actuation. The switch is actuated by applying a magnetic field favoring the opposite polarity and having sufficient magnitude to exceed the coercive (threshold) value. This results in the generation of a single voltage pulse in a sense coil. Removal of the actuating field then results in resetting of the switch to the original polarity.

Figure 6:
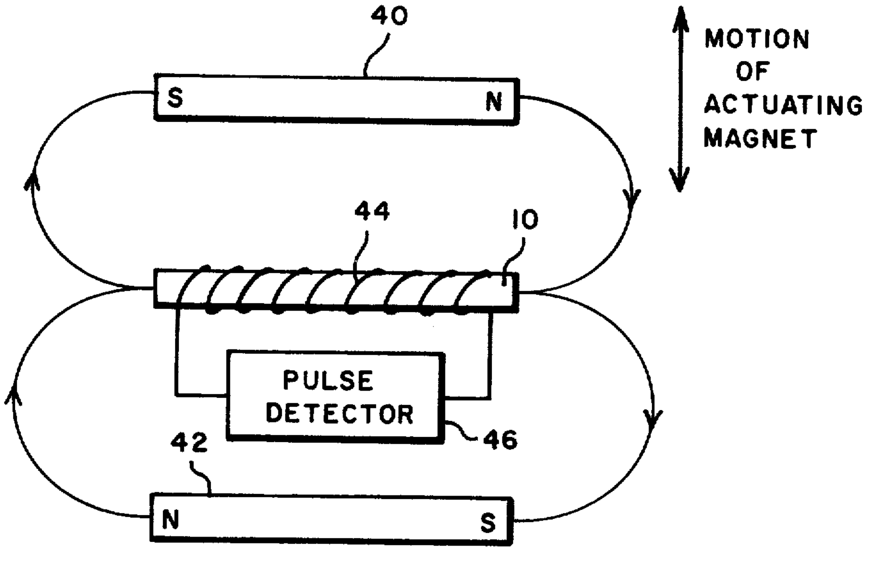
FIG. 6 shows a system utilizing a plated wire magnetic switch in the single event switching mode.

A basic embodiment of the single-event switch is illustrated in FIG. 6. The actuating field is supplied by an actuating bar magnet 40. The reset means is a second bar magnet 42 oriented so that its component of magnetic field along the axis of plated wire switching element 10 is opposite to that of actuating magnet 40. In the absence of actuating magnet 40, the magnetic field $H_R$ of reset magnet 42 exceeds the coercive field of switching element 10 so as to keep switching element 10 in the reset polarity. As actuating magnet 40 is moved toward switching element 10, the field component $H_A$ along the axis of switching element 10 opposes that of $H_R$. When actuating magnet 40 is sufficiently close, the axial field $H_A$ cancels the axial field $H_R$, and the net axial field of $H_A$ and $H_R$ is sufficient to exceed the threshold in the opposite sense to the original polarity. When the threshold is thus exceeded, a voltage pulse is generated in sense coil 44, and detected by pulse detector 46. Withdrawal of actuating magnet 40 allows the reset field $H_R$ to reset the switching element 10 to the original polarity.

Figure 7:
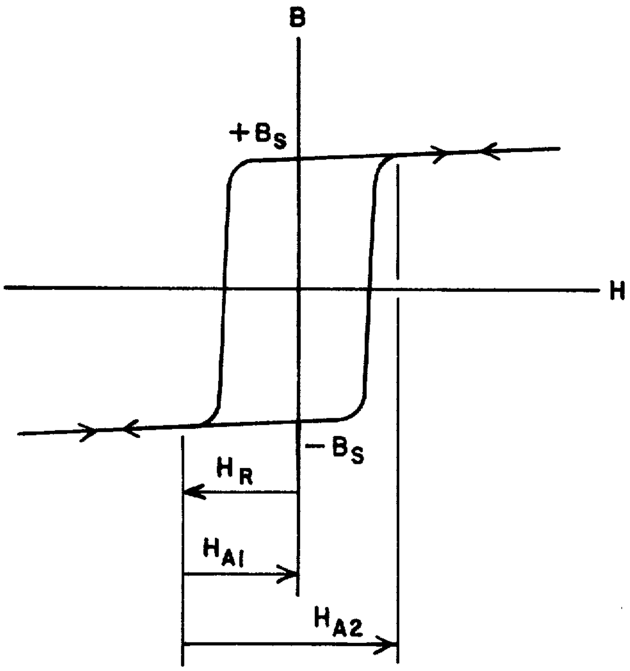
FIG. 7 shows the operation of the system of FIG. 6 using a B-H hysteresis curve.

The operation of the single-event switch is further illustrated in FIG. 7 using the B-H hysteresis loop description of the switching process. This description will be familiar to those acquainted with the magnetic thin film art. In this illustration, $H_R$ represents the magnetic field of the reset magnet 42. In the complete absence of bar magnet 40, $H_R$ is sufficiently large to keep the element in the $-B_s$ state of magnetization. Two magnitudes of the axial field of actuating magnet 40 are illustrated: $H_{A1}$ is the axial field which just overcomes $H_R$, while $H_{A2}$ is the axial field sufficient to exceed $H_R$ by an amount equal to the switching threshold. Application of $H_{A2}$ thus brings about the voltage pulse.

The above description of the single-event switch may be modified in several ways. For example, reset magnet 42 may be replaced by a solenoid or other field coil to supply the reset field, $H_R$. Alternatively, reset magnet 42 may take the form of a magnetic substrate 12 of switching element 10, replacing the non-magnetic substrate previously described.

A study was undertaken to gain insight into the mechanisms of single-event switching. In this study, the experimental apparatus of FIG. 5 was again used. In these experiments the DC bias applied by source 30 was zero and the AC overdrive of drive coil 21 was held constant at 5.2 Oe. The frequency of the drive field was varied down to very low frequencies. This technique provided the best controlled method of applying a magnetic field very slowly to magnetic switching element 10 and observing the resultant single pulse.

The frequency dependence of the switching was observed at frequencies ranging from 1,000 Hz down to 0.1 Hz. A single positive output pulse was examined at each of the frequencies of interest. A marked enhancement of peak pulse height was observed at the highest frequencies. At 10 Hz and below, however, the pulse height appeared to be fairly constant.

Although the exact reason for the frequency dependence of the output at frequencies above 10 Hz is not known, one explanation is as follows. It is known that switching speed in flat permalloy films driven by fast rise applied field pulses depends on the excess of drive field pulse height over coercivity. In the present experiment with sinusoidal drive fields, such effects are also possible, but only if the magnetic field changes an appreciable fraction during the switching process. This process required about 20 to 30 microseconds in the present experiment. In general for an output pulse width designated $(\Delta t)_o$, the change in drive field $\Delta H_o$ during the interval $(\Delta t)_o$ is given by:

$$\Delta H_o = 2\pi f (\Delta t)_o H_m \sqrt{1 - \left(\frac{H_c}{H_m}\right)^2}$$

This equation was solved for several observed frequencies using $(\Delta t)_o$ = 30 microsecond, $H_m$ = 6.5 Oe, and $H_c$ = 1.3 Oe. The calculated results for $\Delta H_o$ together with the observed output pulse height are shown in Table 3.

Table 3

| Frequency | $H_o$ | Output |
|---|---|---|
| 1000 Hz | 1.23 Oe | 58 mV |
| 100 Hz | 0.12 Oe | 42 mV |
| 10 Hz | 0.01 Oe | 27 mV |
| 1 Hz | 0.001 Oe | 27 mV |
| 0.1 Hz | 0.0001 Oe | 30 mV |

It is clear that for enhanced outputs the frequency is sufficient for the drive field to increase appreciably during the duration of the output pulse, while for the lower output this is not the case.

These results suggest that at lower frequencies a "natural" pulse output is achieved which is independent of actuating speed of the applied field. This natural pulse output was examined more carefully by sampling, at random, six of the pulses obtained at frequencies from 10 Hz down to 0.001 Hz. These results revealed two characteristic pulse shapes below 10 Hz. The first pulse shape was similar to that observed at higher frequencies and was a single pulse. The second type of pulse was a broader, double-peaked pulse suggesting a two stage flux reversal process. It is important to note, however, that (a) there was no significant difference among the samplings occurring at the four lower frequencies, and (b) the areas under the pulses were conserved, indicating complete flux reversal with each switching actuation, even at very slow actuating speeds. These experiments, therefore, demonstrated single-event switching capability.

Mechanical Output

In the previous discussion, the output from the plated wire magnetic switching element was sensed electrically by observing the change in magnetization of the switch. It has been discovered, however, that mechanical output from the plated wire magnetic switch is also possible. To describe the mechanical output, a plated wire magnetic switch in the DC or single-event switching mode will be described. It will be understood by those skilled in the art that the pulse interruption magnetic switch may also utilize a mechanical output.

Figure 8A:
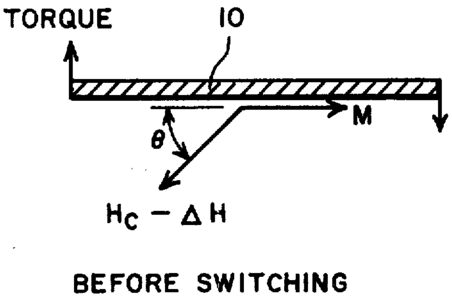
FIGS. 8*a* and 8*b* are geometrical representations of torque on a plated wire magnetic switching element.
Figure 8B:
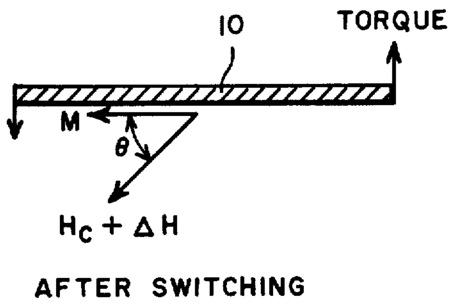

FIGS. 8*a* and 8*b* are geometrical representations of the torque on a plated wire switching element before and after switching. An external field of magnitude H is applied at an arbitrary angle $\theta$ to wire switching element 10 so that the component of H along the easy axis opposes the existing magnetization but is below the threshold $H_c$ by an amount $\Delta H$. In this condition, a mechanical torque exists on wire switching element 10 by virtue of the magnetic interaction between the magnetic field and the magnetization, M, of the plated wire. This torque has a clockwise sense in FIG. 8*a*. This condition is labeled "before switching."

When the magnetic field on plated wire switching element 10 is increased to a level greater than the threshold (i.e. $H_c + \Delta H$), the magnetization and the torque reverse direction, so that the torque is now counterclockwise. This condition is labeled "after switching." The torque can be read directly or by means of a transducer.

Figure 9:
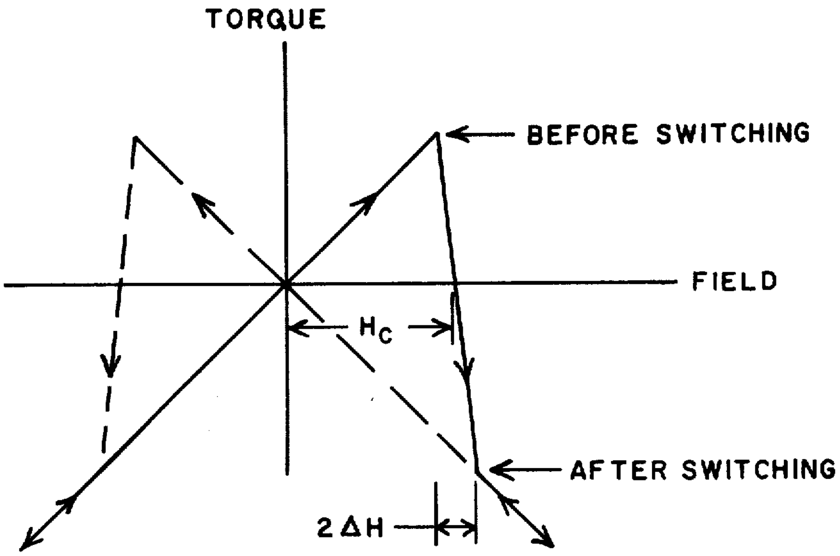
FIG. 9 is a graph of torque on a plated wire magnetic switching element as a function of external magnetic field applied to the element.

The torque change may also be described by a plot of torque versus applied field, as is shown in FIG. 9. In this Figure, the switching branch is shown as a solid curve, and the reversal branch as a dashed curve.

The sensitivity of the plated wire magnetic switch may be defined by the increment of field, $2\Delta H$, required to bring about torque reversal. This increment has been observed to be less than 0.01 Oe under certain conditions. Thus, this mode of switching gives a very square loop mechanical output with switching threshold determined by the orientation of the external magnetic field.

A special property of the plated wire magnetic switch, with respect to angle of the applied actuating field, has been observed. For any such angle $\theta$, it has been found that the threshold field $H_c(\theta)$ is described with good accuracy by the following expression:

$$H_c(\theta) = H_c(0)/\cos\theta$$

where $H_c(0)$ = threshold field at $\theta = 0$

This expression has been found to hold with good accuracy regardless of the helical angle of easy magnetization within the cylindrical film. Each particular helical angle will, however, have its own unique value of $H_c(0)$. This angular dependence of threshold field applies to any form of read-out, mechanical or electrical, and to any means of applying the actuating magnetic field. It can be seen that the determination of $H_c(\theta)$ may be used as a measure of $\theta$.

Figure 10:
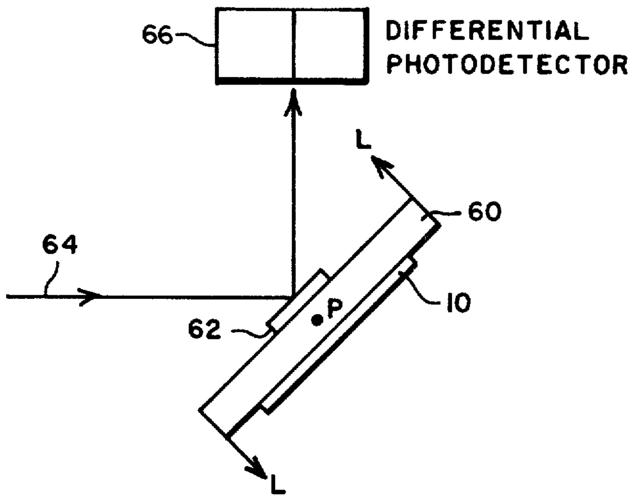
FIGS. 10 and 11 show systems utilizing the plated wire magnetic switch with a mechanical output.

FIG. 10 is a top schematic drawing of a torquemeter which has been used for mechanical torque read-out in single-event switching. Plated wire switching element 10 is cemented to a non-magnetic plate 60, or, alternatively, placed within a capillary tube cemented to plate 60. Plate 60 is suspended with its plane vertical, by means of a wire attached at point P. Application of a magnetic field H in the horizontal plane causes a torque, L, on plated wire 10, as described previously. This torque is transmitted to plate 60, causing a rotation of plate 60. As a consequence, a mirror 62 attached to plate 60, or to an extension thereof, causes a light beam 64 to be deflected. This results in an unbalance signal in differential photodetector 66. In other words, actuation of the switch causes a voltage or current pulse in the photodetector sensing circuit which is a measure of the change in mechanical torque associated with the single switching event. The magnitude of this signal is a measure of the torque, L. Alternatively, a feedback arrangement may be used to balance the torque by means of a current in a coil attached to the plate or to an extension thereof. In this case current is a measure of the torque.

Figure 11:
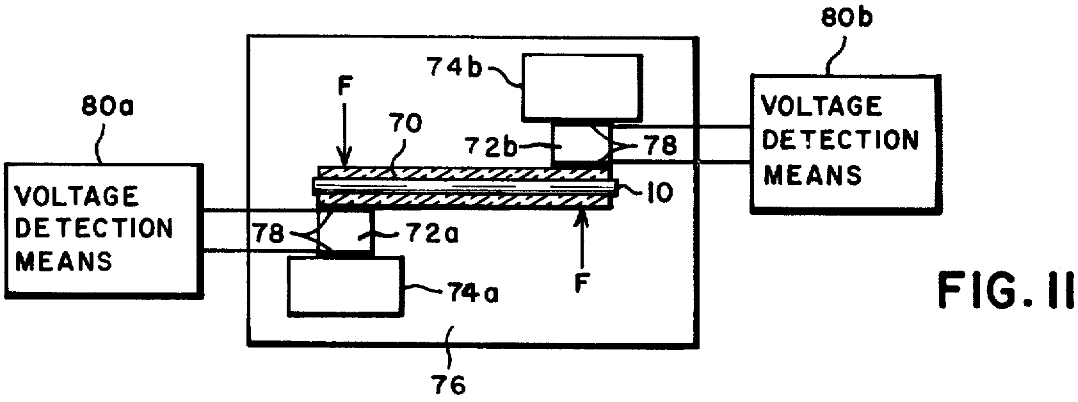

FIG. 11 is a top view of a second means of mechanical output detection. The plated wire switching element 10 is held within a capillary 70 which is cemented at each end to transducer elements 72*a* and 72*b*. These transducer elements 72*a* and 72*b* may be piezoelectric materials such as quartz, or other pressure sensitive transducer materials. The transducer elements are in turn connected to supports 74*a* and 74*b*, which are fastened by suitable means to plate 76.

The operation of the switch of FIG. 11 is as follows. Application of a magnetic field in the plane of plate 76 and at an arbitrary angle to switching element 10 causes a torque on switching element 10. This torque is transmitted to capillary 70, and corresponding forces F are transmitted to transducer elements 72*a* and 72*b*. These forces may be either compressive, as shown, or extensive, in the case of an opposite direction of torque. As a result of forces F, pressures are developed on transducer elements 72*a* and 72*b*, resulting in voltages developed across electrical contacts 78. These voltages are registered by voltage detection means 80*a* and 80$b$. In other words, actuation of the switch causes a voltage pulse in the voltage detection means 80$a$ and 80$b$, which is a measure of the change in torque resulting from the single-event switching event.

It should be noted that the operation of the transducer version of the switch shown in FIG. 11 can also be achieved by placing both transducers 72$a$ and 72$b$ on the same side of plated wire switching element 10. In this case, a torque causes compression in one transducer element and extension in the other, so that changes of voltage in transducer elements 72a and 72b will be of opposite sign.

CONCLUSION

The plated wire magnetic switch of the present invention is capable of operation in a variety of modes with a variety of outputs. In addition, the magnetic switch is capable of actuation with very small applied external fields. The variety of switching modes and outputs as well as the sensitivity of the switch make it suited for a large variety of applications.

Although the present invention has been described with reference to a series of preferred embodiments, persons skilled in the art will recognize that various modifications, adaptations, and variations may be made without departing from the teachings of the present invention. For example, the pulse interruption switching mode has been described with the actuator means applying an external magnetic field to turn the switch "off." Skilled workers will recognize, however, that the switch could also be initially biased "off" and that the actuator means could then turn the switch of by supplying an external magnetic field which opposes the bias field.

The embodiments of the invention in which an exclusive property or right is claimed are defined as follows:

1. A magnetically actuated switch comprising: a wire substrate;

an anisotropic, essentially zeromagnetostrictive magnetic film covering the wire substrate, the magnetic film having an easy axis of magnetization oriented at an angle with respect to the circumferential direction;

actuator means for applying an external magnetic field with a component along the axis of the wire substrate sufficient to change the state of the magnetically actuated switch from a first state to a second state; and output means for sensing whether the magnetically actuated switch is in the first or the second state.

2. The magnetically actuated switch of claim 1 wherein the output means comprises mechanical sensing means.

3. The magnetically actuated switch of claim 2 wherein the output means comprises means for sensing the torque on the wire.

4. The magnetically actuated switch of claim 1 wherein the output means comprises electrical sensing means.

5. The magnetically actuated switch of claim 1 wherein the output means comprises a coil.

6. The magnetically actuated switch of claim 1 and further comprising:

input means for applying an input magnetic field with a component along the axis of the wire substrate, the magnetic field having a predetermined magnitude.

7. The magnetically actuated switch of claim 6 wherein the input means applies an input magnetic field with a component along the axis of the wire substrate sufficient to periodically reverse the magnetization direction of the magnetic film.

8. The magnetically actuated switch of claim 7 wherein the actuator means applies an actuating magnetic field with a component along the axis of the wire substrate sufficient to inhibit reversal of the magnetization direction of the magnetic film, and wherein the output means senses whether the magnetic film is in a reversing or a non-reversing state.

9. The magnetically actuated switch of claim 8 wherein the input means comprises:

bias field means for applying a magnetic bias field to the magnetic film with a component along the axis of the wire substrate; and alternating field means for applying an alternating magnetic field to the magnetic film with a component along the axis of the wire substrate.

10. The magnetically actuated switch of claim 1 wherein the magnetic film has its easy axis of magnetization oriented along the axis of the wire substrate.

11. The magnetically actuated switch of claim 1 wherein the magnetic film has its easy axis of magnetization oriented in a direction intermediate between the axial and circumferential directions.

12. The magnetically actuated switch of claim 1 wherein the actuator means applies an external magnetic field for reversing the magnetization direction of the magnetic film from a first direction to a second direction.

13. The magnetically actuated switch of claim 12 wherein the output means senses whether the magnetization direction of the magnetic film is aligned in the first direction or the second direction.

14. The magnetically actuated switch of claim 12 wherein output means senses the reversal of the magnetization direction of the magnetic film when an external magnetic field is applied.

15. The magnetically actuated switch of claim 12 and further comprising:

reset means for resetting the magnetization direction of the magnetic film.

16. The magnetically actuated switch of claim 12 wherein the output means comprises mechanical sensing means.

17. The magnetically actuated switch of claim 12 wherein the output means comprises means for sensing the torque on the wire substrate.

18. The magnetically actuated switch of claim 12 wherein the output means comprises electrical sensing means.

19. The magnetically actuated switch of claim 12 wherein the electrical sensing means comprises a coil.

20. The magnetically actuated switch of claim 12 wherein the magnetic film has its easy axis of magnetization oriented along the axis of the wire substrate.

21. The magnetically actuated switch of claim 12 wherein the magnetic film has its easy axis of magnetization oriented in a direction intermediate between the axial and circumferential directions.

22. A magnetically actuated switch capable of changing from a first state to a second state in response to an external magnetic field, the magnetically actuated switch comprising:

a wire substrate;

an anisotropic, essentially zeromagnetostrictive magnetic film covering the wire substrate, the magnetic film having an easy axis of magnetization oriented at an angle with respect to the circumferential direction; and output means for sensing whether the magnetically actuated switch is in the first or the second state.

23. The magnetically actuated switch of claim 22 and further comprising:

input means for applying an input magnetic field with a component along the axis of the wire substrate, the magnetic field having a predetermined magnitude.

24. The magnetically actuated switch of claim 23 wherein the input means applies an input magnetic field with a component along the axis of the wire substrate sufficient to periodically reverse the magnetization direction of the magnetic film.

25. The magnetically actuated switch of claim 24 wherein external magnetic field is applied along the axis of the wire substrate and is sufficient to inhibit reversal of the magnetization direction of the magnetic film, and wherein the output means senses whether the magnetic film is in a reversing or a non-reversing state.

26. The magnetically actuated switch of claim 25 wherein the input means comprises:

bias field means for applying a magnetic bias field to the magnetic film with a component along the axis of the wire substrate; and alternating field means for applying an alternating magnetic field to the magnetic film with a component along the axis of the wire substrate.

27. The magnetically actuated switch of claim 22 wherein the external magnetic field reverses the magnetization direction of the film from a first directin to a second direction.

28. The magnetically actuated switch of claim 27 wherein the output means senses whether the magnetization direction of the magnetic film is aligned in the first direction or the second direction.

29. The magnetically actuated switch of claim 27 wherein output means senses the reversal of the magnetization direction of the magnetic film when an external magnetic field is applied.

30. The magnetically actuated switch of claim 27 and further comprising:

reset means for resetting the magnetization direction of the magnetic film.

* * * * *